United States Patent
Rammelkamp

(10) Patent No.: US 11,141,754 B2
(45) Date of Patent: Oct. 12, 2021

(54) PRODUCT (COATING) APPLICATOR WITH BARRIER LAYER

(71) Applicant: Ian Rammelkamp, San Diego, CA (US)

(72) Inventor: Ian Rammelkamp, San Diego, CA (US)

(*) Notice: Subject to any disclaimer, the term of this patent is extended or adjusted under 35 U.S.C. 154(b) by 0 days.

(21) Appl. No.: 16/678,932

(22) Filed: Nov. 8, 2019

(65) Prior Publication Data
US 2020/0147636 A1 May 14, 2020

Related U.S. Application Data

(60) Provisional application No. 62/757,605, filed on Nov. 8, 2018.

(51) Int. Cl.
*A47L 13/12* (2006.01)
*B05C 1/06* (2006.01)
*B32B 9/04* (2006.01)
*B32B 33/00* (2006.01)
*A47L 13/28* (2006.01)

(52) U.S. Cl.
CPC ............ *B05C 1/06* (2013.01); *A47L 13/12* (2013.01); *A47L 13/28* (2013.01); *B32B 9/046* (2013.01); *B32B 9/047* (2013.01); *B32B 33/00* (2013.01); *B32B 2307/726* (2013.01); *B32B 2307/73* (2013.01)

(58) Field of Classification Search
CPC .......... A47L 13/16; A47L 13/28; A47L 13/12; B32B 9/046
See application file for complete search history.

(56) References Cited

U.S. PATENT DOCUMENTS

| | | | | |
|---|---|---|---|---|
| RE26,385 E | * | 5/1968 | Gilchrist | A47L 23/10 15/210.1 |
| 5,019,064 A | * | 5/1991 | Eilender | A61F 5/4401 128/889 |
| 5,109,874 A | * | 5/1992 | Bellingham | A61F 15/004 128/888 |
| 5,973,221 A | * | 10/1999 | Collyer | A61F 13/00034 602/46 |
| 6,734,157 B2 | * | 5/2004 | Radwanski | A61L 2/18 510/439 |
| 10,219,672 B2 | * | 3/2019 | Calimano | B32B 27/302 |
| 2004/0049145 A1 | * | 3/2004 | Flick | A61F 13/104 602/41 |
| 2007/0048062 A1 | * | 3/2007 | Brunner | A47L 21/04 401/7 |
| 2007/0206984 A1 | * | 9/2007 | Fagel | C11D 17/049 401/7 |
| 2011/0143083 A1 | * | 6/2011 | Scorgie | B32B 5/24 428/95 |
| 2012/0232510 A1 | * | 9/2012 | Greco | A61F 13/51394 604/372 |
| 2017/0164806 A1 | * | 6/2017 | Calimano | A47L 13/16 |
| 2019/0083322 A1 | * | 3/2019 | Huang | A61F 13/00059 |

* cited by examiner

*Primary Examiner* — Michael D Jennings
(74) *Attorney, Agent, or Firm* — Lewis Kohn & Walker LLP; David M. Kohn; Kari Moyer-Henry

(57) ABSTRACT

Liquid product application (ceramic coatings, surface sealants) tools/medium are disclosed herein. More particularly, a liquid product applicator having an impenetrable layer of material between the absorbent textile layer, for example microfiber, and an interior substrate layers of a composite product (foam).

7 Claims, 7 Drawing Sheets

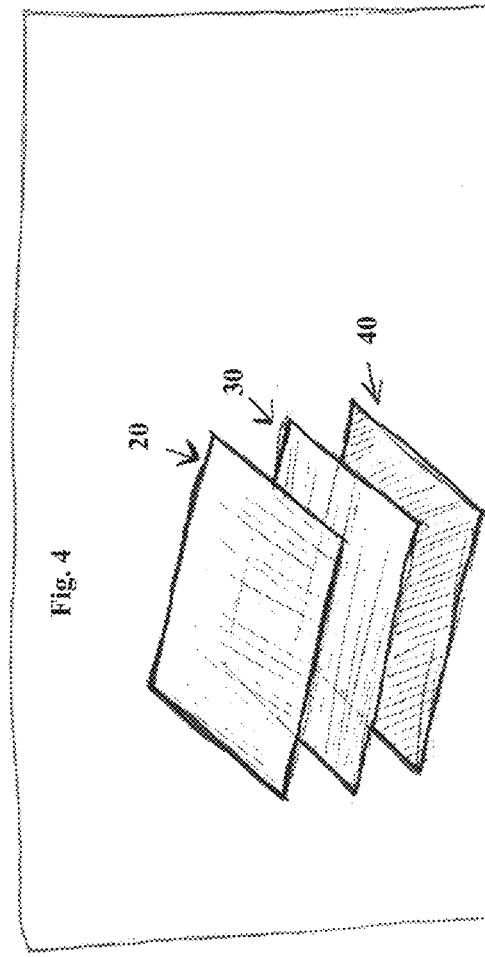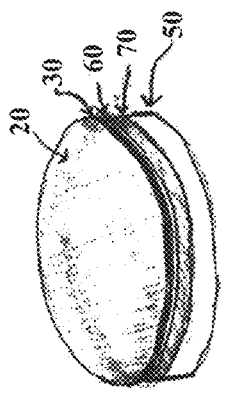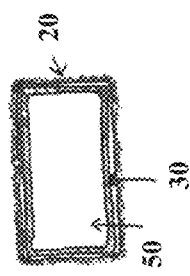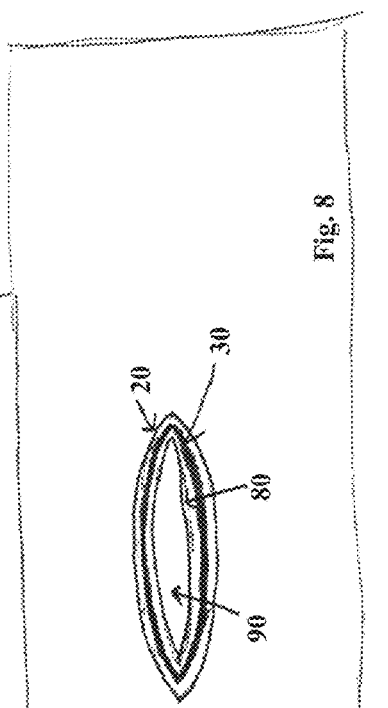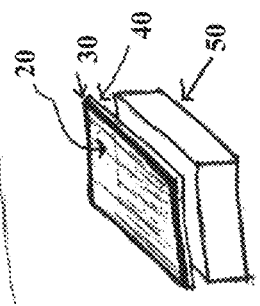

PRODUCT (COATING) APPLICATOR WITH BARRIER LAYER

RELATED APPLICATIONS

This application is a non-provisional patent application claiming the benefit of priority from Provisional Application Ser. No. 62/757,605, filed Nov. 8, 2018, the contents of which are incorporated by reference herein.

FIELD OF THE INVENTION

The present invention pertains generally to liquid product application (ceramic coatings, surface sealants) tools/medium. More particularly, the present invention pertains to an impenetrable layer of material between the absorbent textile layer (in this case microfiber) and interior substrate layers of the composite product (foam or Velcro).

It is an object of the present invention to provide the desired features described herein as well as additional advantages of preventing the liquid product being applied to the surface from soaking through, past the outer (absorbent) layer of the applicator, to interior layers. This prevents the product from being wasted, insuring that the maximum amount of the product is applied to a surface and not lost in the inner substrates of the applicator composite product.

SUMMARY OF THE INVENTION

The present invention is a barrier layer between the outer layer of the applicator and inner substrates of the applicator product.

It is an object of the present invention to provide a barrier layer between the outer microfiber layer and inner sponge layer of the applicator sponge.

It is a further object of the present invention to provide a barrier layer between the microfiber layer and the hook and loop layers of machine or hand applied applicators.

It is another object of the present invention to provide a barrier layer between the microfiber layer and any other interior components of a composite product for product application.

It is yet another object of the present invention to provide a barrier layer on an applicator wherein the barrier layer prevents the product being applied from soaking through the outer material layer of the applicator.

It is still another object of the present invention to provide a barrier layer on an applicator wherein the barrier layer reduces wasting of product being applied and improves product application overall.

It is another object of the present invention to provide a barrier layer on an applicator wherein the applicator is used for the application of liquids including, but no limited to, coatings sealants and wax products.

BRIEF DESCRIPTION OF THE DRAWINGS

The novel features of this invention, as well as the invention itself, both as to its structure and its operation, will be best understood from the accompanying pictures, taken in conjunction with the accompanying description, in which similar reference characters refer to similar parts, and in which:

FIG. 4 illustrates a deconstructed applicator composite.

FIG. 5 illustrates a cross section of a hand applicator block.

FIG. 6 illustrates an embodiment of the applicator of the present invention.

FIG. 7 illustrates an alternate embodiment of the applicator of the present invention.

FIG. 8 illustrates a cross section of a mitt applicator of the present invention.

DETAILED DESCRIPTION OF THE INVENTION

Figure 1A:
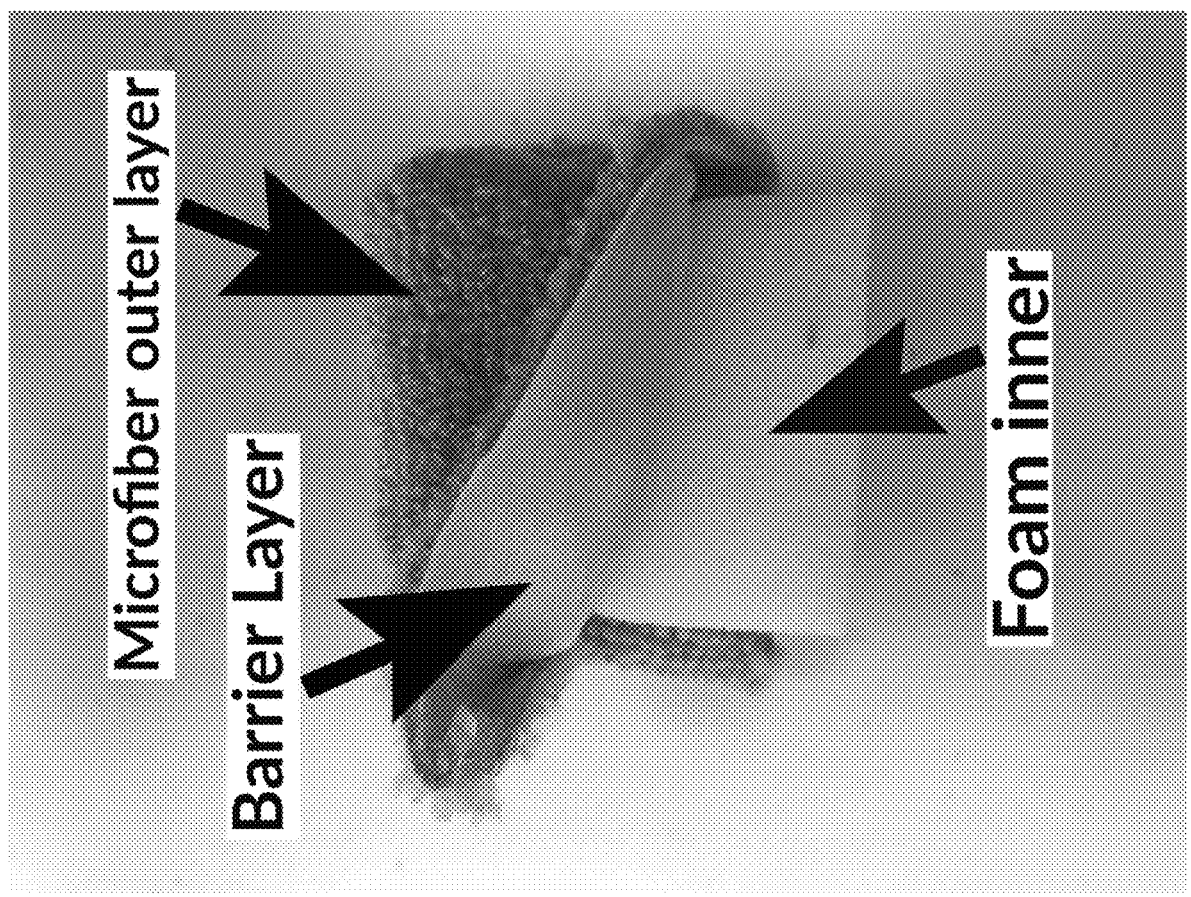
FIG. 1A-1C illustrate the applicator with the microfiber layer, barrier layer, and foam layer.
Figure 1B:
Figure 1C:
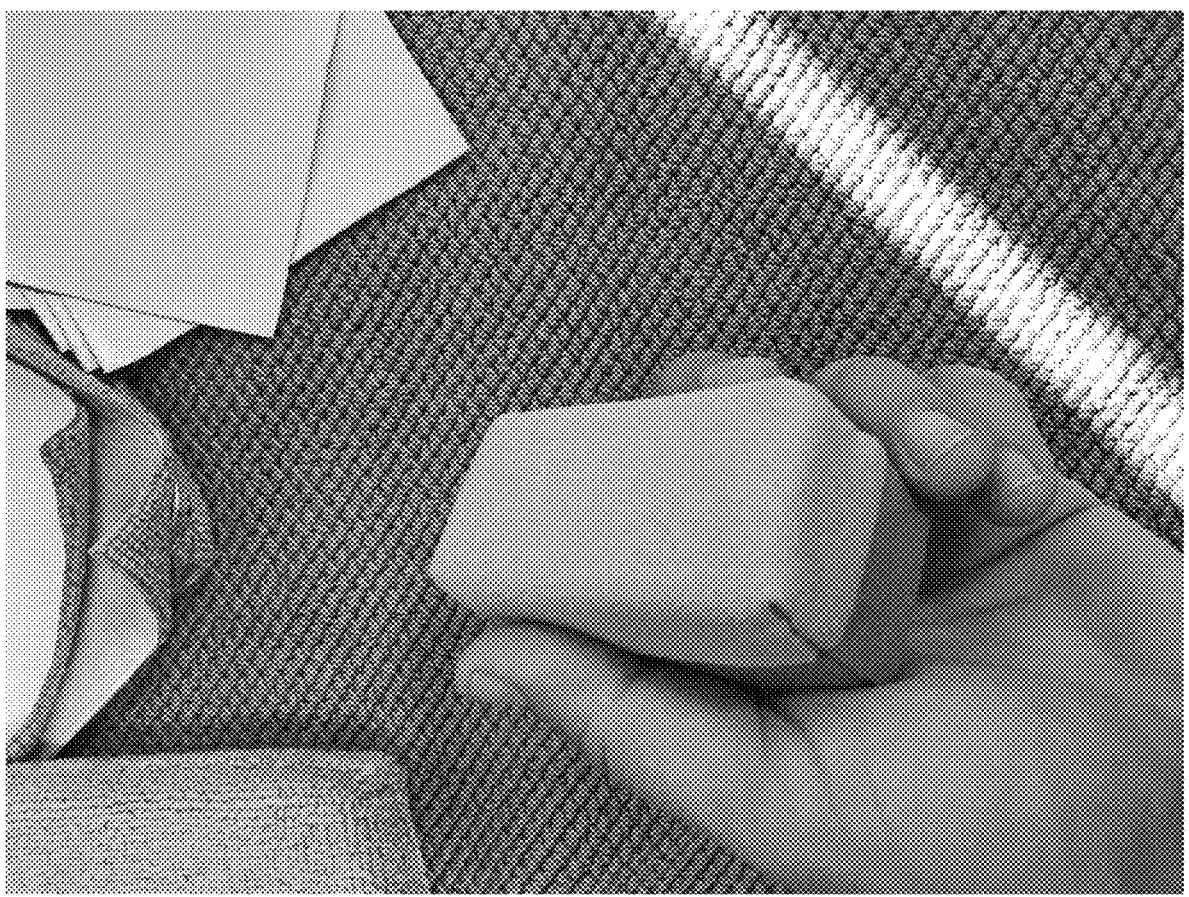

With reference to FIG. 1A, shown is a deconstructed applicator comprised of a foam inner, a barrier layer, and an outer fabric (microfiber layer). FIGS. 1B, and 1C show the final (non-deconstructed) applicator of the present invention.

Figure 2A:
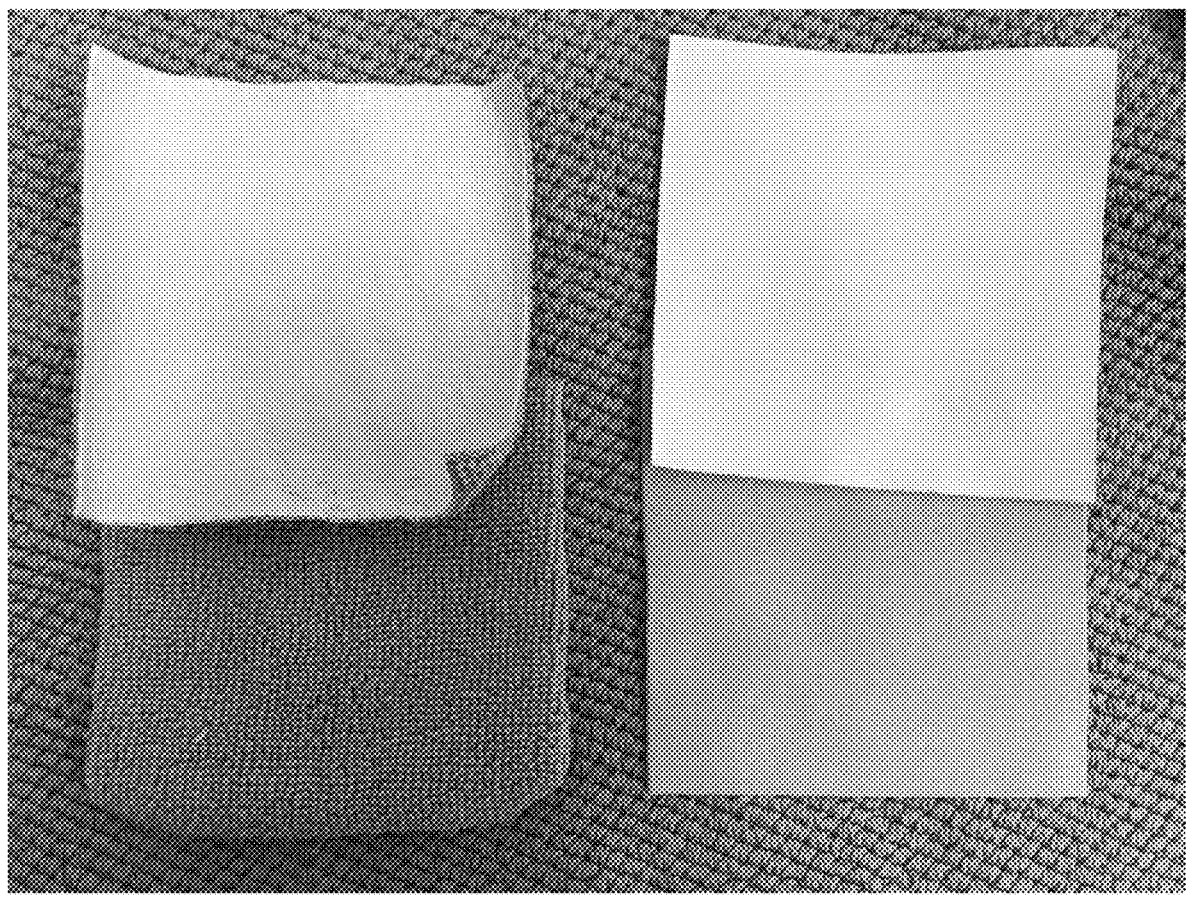
FIG. 2A illustrates a separate microfiber layer and plastic barrier layer, wrapped around a separate foam layer.

With reference to FIG. 2A, an absorbent fabric layer is shown with a barrier layer.

Figure 2B:
FIG. 2B illustrates the microfiber and plastic layer as a composite without any interior substrates.

With reference to FIG. 2B, an absorbent fabric layer/barrier composite is wrapped around a separate foam applicator.

Figure 3A:
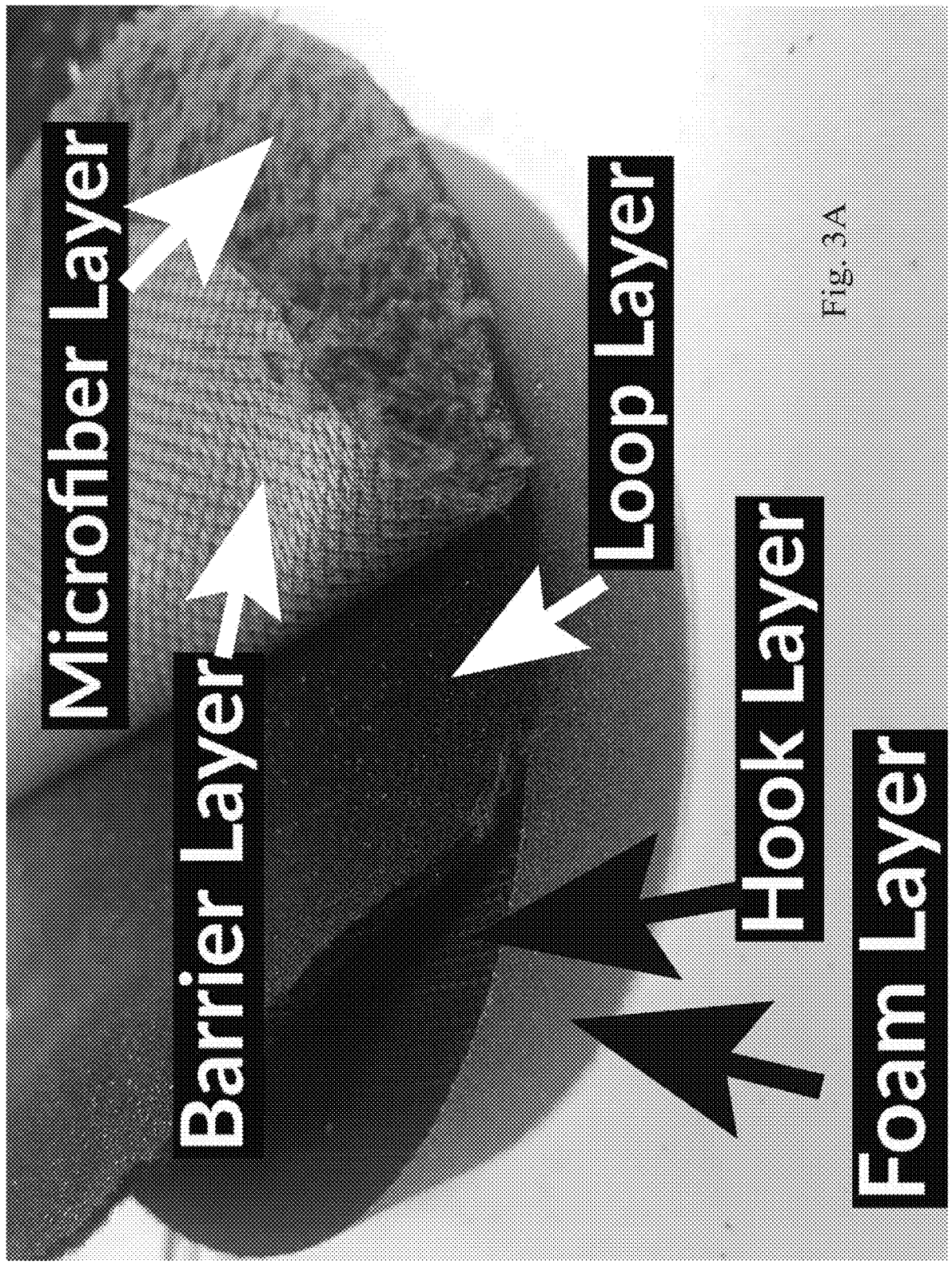
FIG. 3A illustrates the parts of the applicator as a separate sheet of microfiber, plus barrier layer, plus loop (Velcro) layer, as it is attached to a foam pad with hook and loop.

With reference to FIG. 3A, shown is an absorbent fabric layer, barrier layer, and loop layer (Velcro), with an accompanying foam applicator with hook layer (Velcro).

With reference to FIG. 4, shown is a deconstructed applicator composite wherein the composite is comprised of an absorbent outer layer 20, hydrophobic inner barrier layer 30, and connection/foundation layer 40.

With reference to FIG. 5, shown is a cross section of a hand applicator block wherein the block is comprised of a foam foundation layer 50 having a hydrophobic inner barrier layer 30 adjacent to and surrounding the foam and an absorbent outer layer 20 adjacent to and surrounding the barrier layer.

With reference to FIG. 6, shown is a one embodiment of the applicator of the present invention wherein the applicator is comprised of vertical layers wherein the vertical layers are comprised of a foam foundation layer 50 covered by a hook attachment layer 70 which is thereby covered by a loop attachment layer 60 which is thereby covered by a hydrophobic barrier layer 30 which is thereby covered by an absorbent application layer 20.

With reference to FIG. 7, shown is an alternative embodiment of the applicator of the present invention wherein the applicator is comprised of vertical layers wherein the vertical layers are comprised of a foam block foundation layer 50 which is thereby covered by a contact adhesion connection layer 40 which is thereby covered by a hydrophobic carrier layer 30 which is thereby covered by an absorbent application layer 20.

With reference to FIG. 8, shown is a cross section of a mitt applicator of the present invention wherein the mitt is comprised of concentric layers wherein the layers are comprised of a mitt inner lining 80 which defines the hand opening 90, the inner lining surround thereby a hydrophobic barrier layer 20 which is surrounded thereby an absorbent outer application layer 20.

One embodiment of the present invention provides the absorbent microfiber layer, with the barrier layer glued to its inside surface, and wrapped and sewn around a foam core.

Another embodiment of the present invention provides the absorbent microfiber layer, with the barrier layer glued to its inner surface, and manually wrapped around a separate foam core.

A further embodiment of the present invention provides the absorbent microfiber layer, with the barrier layer glued between it and a loop fabric, for attachment to hook material on a foam applicator.

Another embodiment of the present invention provides a hand applicator block wherein the block is comprised of a foam foundation layer having a hydrophobic inner barrier layer adjacent to and surrounding the foam and an absorbent outer layer adjacent to and surrounding the barrier layer.

Yet another embodiment of the present invention provides an applicator composite wherein the composite is comprised of an absorbent outer layer, hydrophobic inner barrier layer, and a connection/foundation layer.

A further embodiment of the present invention provides an applicator wherein the applicator is comprised of vertical layers wherein the vertical layers are comprised of a foam foundation layer covered by a hook attachment layer which is thereby covered by a loop attachment layer which is thereby covered by a hydrophobic barrier layer which is thereby covered by an absorbent application layer.

Still another embodiment of the present invention provides a block applicator wherein the applicator is comprised of vertical layers wherein the vertical layers are comprised of a foam block foundation layer which is thereby covered by a contact adhesion connection layer which is thereby covered by a hydrophobic carrier layer which is thereby covered by an absorbent application layer.

Another embodiment of the present invention provides a mitt applicator wherein the mitt is comprised of concentric layers wherein the layers are comprised of a mitt inner lining which defines the hand opening, the inner lining surround thereby a hydrophobic barrier layer which is surrounded thereby an absorbent outer application layer.

Yet another embodiment of the present invention provides a barrier layer on an applicator wherein the barrier layer prevents the product being applied from soaking through the outer material layer of the applicator.

Still another embodiment of the present invention provides a barrier layer on an applicator wherein the barrier layer reduces wasting of product being applied and improves product application overall.

Another embodiment of the present invention provides a barrier layer on an applicator wherein the applicator is used for the application of liquids including, but no limited to, coatings sealants and wax products.

It will be appreciated that details of the foregoing embodiments, given for purposes of illustration, are not to be construed as limiting the scope of the invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is further defined in the converted utility application and appended claims. Further, it is recognized that many embodiments may be conceived that do not achieve all the advantages of some embodiments, particularly preferred embodiments, yet the absence of a particular advantage shall not be construed to necessarily mean that such an embodiment is outside the scope of the present invention.

The invention claimed is:

1. A liquid product applicator, wherein the applicator consists of:
   a non-abrasive microfiber absorbent layer;
   a barrier layer, wherein the absorbent layer and the barrier layer are formed into a single composite layer; and
   a foam foundation, wherein the applicator is further comprised of a loop layer and an accompanying hook layer.

2. The liquid product applicator of claim 1, wherein the barrier layer is hydrophobic.

3. The liquid product applicator of claim 1, wherein the composite layer is formed when the barrier layer is glued to the inside surface of the absorbent layer, which is further wrapped and sewn around the foam foundation.

4. The liquid product applicator of claim 1, wherein the composite layer is formed when the barrier layer glued to the inner surface of the absorbent layer which is manually wrapped around the foam foundation.

5. A liquid product applicator, wherein the applicator is in the shape of a mitt, wherein the mitt consists of an inner lining, a barrier layer and a non-abrasive microfiber absorbent layer wherein the absorbent layer and the barrier layer are formed into a single composite layer, and further wherein the barrier layer prevents the liquid product to be applied from entering the inner liner.

6. The liquid product applicator of claim 5, wherein the inner lining defines the opening for a user's hand.

7. The liquid product applicator of claim 5, wherein the barrier layer is hydrophobic.

* * * * *